(12) United States Patent
Yoshitake et al.

(10) Patent No.: US 8,884,572 B2
(45) Date of Patent: Nov. 11, 2014

(54) SIGNAL PROCESSOR, ENCODER, AND MOTOR SYSTEM

(71) Applicant: Kabushiki Kaisha Yaskawa Denki, Kitakyushu (JP)

(72) Inventors: Hironobu Yoshitake, Kitakyushu (JP); Toshikazu Sakata, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 29 days.

(21) Appl. No.: 13/632,159

(22) Filed: Oct. 1, 2012

(65) Prior Publication Data

US 2013/0026965 A1    Jan. 31, 2013

Related U.S. Application Data

(63) Continuation of application No. PCT/JP2011/051215, filed on Jan. 24, 2011.

(30) Foreign Application Priority Data

Apr. 2, 2010    (JP) ................................. 2010-085799

(51) Int. Cl.
    *G05B 19/29*    (2006.01)
(52) U.S. Cl.
    USPC .......................................... 318/602; 318/601
(58) Field of Classification Search
    USPC ....................... 318/601, 602, 661, 798, 799
    See application file for complete search history.

(56) References Cited

U.S. PATENT DOCUMENTS

| 5,254,919 | A | * | 10/1993 | Bridges et al. ................ 318/560 |
| 5,642,461 | A | * | 6/1997 | Lewis ............................ 388/812 |
| 5,721,546 | A | | 2/1998 | Tsutsumishita |
| 5,994,893 | A | * | 11/1999 | Maruyama et al. ........... 324/144 |
| 6,172,359 | B1 | * | 1/2001 | Stridsberg ................ 250/231.13 |
| 6,768,956 | B2 | * | 7/2004 | Hayashi ......................... 702/91 |

(Continued)

FOREIGN PATENT DOCUMENTS

| CN | 1135038 | 11/1996 |
| JP | 04-328410 | 11/1992 |

(Continued)

OTHER PUBLICATIONS

International Search Report for corresponding International Application No. PCT/JP2011/051215, Jul. 12, 2011.

(Continued)

*Primary Examiner* — Rina Duda
(74) *Attorney, Agent, or Firm* — Mori & Ward, LLP

(57) ABSTRACT

A signal processor includes an AD converter that converts a periodic analog signal output from a detector in accordance with a position Q of a motor to a digital signal at a predetermined conversion period, a tracking circuit that calculates a position P of the motor at an arithmetic period on the basis of the digital signal that is converted and output at the conversion period by the AD converter, an operation state identifier that identifies an operation state of the motor on the basis of the position P of the motor calculated by the tracking circuit, and an arithmetic period determiner that changes the arithmetic period of the tracking circuit in accordance with the operation state of the motor identified by the operation state identifier such that the position P of the motor calculated by the tracking circuit follows the actual position Q of the motor.

6 Claims, 6 Drawing Sheets

(56) References Cited

U.S. PATENT DOCUMENTS

| | | | |
|---|---|---|---|
| 6,931,918 B2* | 8/2005 | Herb | 73/114.26 |
| 7,508,154 B1* | 3/2009 | Labriola, II | 318/602 |
| 2008/0092893 A1* | 4/2008 | Boyle et al. | 128/204.21 |

FOREIGN PATENT DOCUMENTS

| | | |
|---|---|---|
| JP | 08-272420 | 10/1996 |
| JP | 10-19598 | 1/1998 |
| JP | 2008-299426 | 12/2008 |
| JP | 2009-148055 | 7/2009 |

OTHER PUBLICATIONS

Translation of Written Opinion of the International Searching Authority for corresponding International Application No. PCT/JP2011/051215, Jul. 12, 2011.

English translation of Chinese Office Action for corresponding CN Application No. 201180017393.1, Jun. 3, 2014 (Original document was filed on Jul. 13, 2014 in this application).

Lygouras et al., "High-Performance Position Detection and Velocity Adaptive Measurement for Closed-Loop Position Control", IEEE Transactions on Instrumentation and Measurement, Aug. 1, 1998, vol. 47, Jo. 4, IEEE Service Center, Piscataway, NJ, U.S., XP011024556.

Lygouras et al., "A new method for digital encoder adaptive velocity/acceleration evaluation using a TDC with picosecond accuracy", Microprocessors and Microsystems, Oct. 1, 2009, pp. 453-460, vol. 33, No. 7-8, Business Press Ltd. London, GB, XP026721836.

Extended European Search Report for corresponding EP Application No. 11765262.8-1556, Aug. 25, 2014.

* cited by examiner

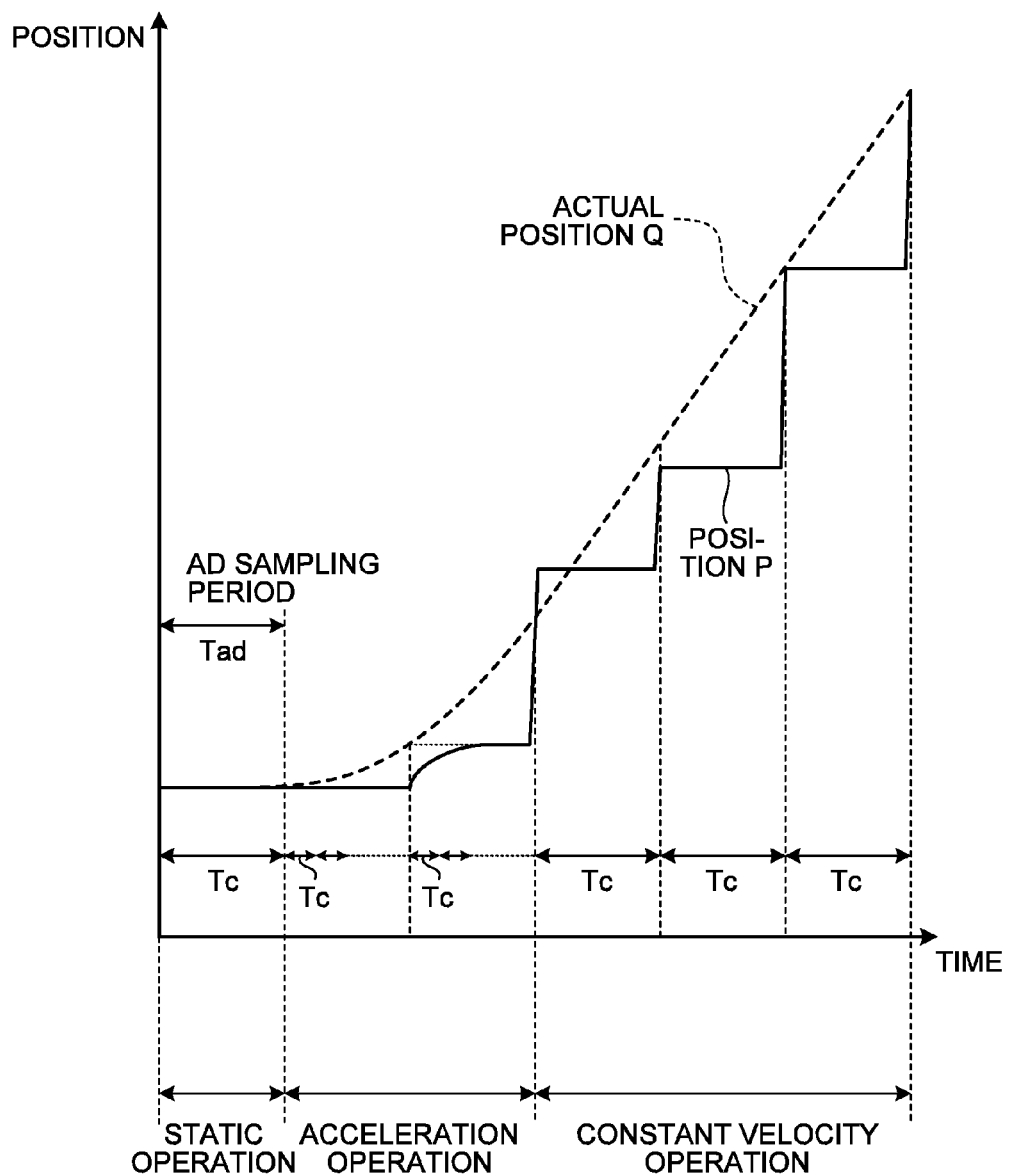

SIGNAL PROCESSOR, ENCODER, AND MOTOR SYSTEM

CROSS REFERENCE TO RELATED APPLICATIONS

This application is a continuation of PCT international application Ser. No. PCT/JP2011/051215 filed on Jan. 24, 2011 which designates the United States, and which claims the benefit of priority from Japanese Patent Application No. 2010-085799, filed on Apr. 2, 2010; the entire contents of which are incorporated herein by reference.

FIELD

The present invention relates to a signal processor, an encoder, and a motor system.

BACKGROUND

Encoders are used as means for detecting positions of servo motors, for example. An example of the encoders primarily includes a detector and a signal processor.

The detector outputs an analog sine wave signal and an analog cosine wave signal in accordance with a position (a rotational angle and the like) of the motor. The signal processor converts the analog sine wave signal and the analog cosine wave signal output from the detector into digital signals using AD conversion and obtains the position of the motor. The signal processor uses a tracking technique as a technique to calculate the position of the motor. In the position calculation method by the tracking technique, the position of the motor is obtained by performing processing by the tracking technique once at AD conversion timing when the analog sine wave signal and the analog cosine wave signal from the detector are converted into the digital signals like an encoder as described in Japanese Patent Application Laid-open No. H4-328410 (FIG. 1).

In the encoder, however, the processing by the tracking technique by a signal processor does not follow an actual position of the motor when the position of the motor is rapidly changed, thereby causing a delay (a positional difference).

SUMMARY

A signal processor according to an embodiment includes an AD converter, a tracking circuit, an operation state identifier, and an arithmetic period determiner. The AD converter configured to convert a periodic analog signal output from a detector in accordance with a position of a motor into a digital signal at a predetermined conversion period. The tracking circuit configured to calculate the position of the motor at an arithmetic period on the basis of the digital signal that is converted and outputted at the conversion period by the AD converter. The operation state identifier configured to identify an operation state of the motor on the basis of the position of the motor calculated by the tracking circuit. The arithmetic period determiner configured to change the arithmetic period of the tracking circuit in accordance with the operation state of the motor identified by the operation state identifier such that the position of the motor calculated by the tracking circuit follows an actual position of the motor.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 6 is a graph illustrating a relationship between the detection position P detected by the encoder and the actual position Q in the embodiment.

DESCRIPTION OF EMBODIMENT

An embodiment of the present invention is described in detail below with reference to the accompanying drawings. In the present description and the drawings, components having substantially the same function are basically labeled with the same numerals and the duplicated explanations thereof are omitted.

EXAMPLE 1

<Embodiment>
(1. Structure of Motor System)

Figure 1:
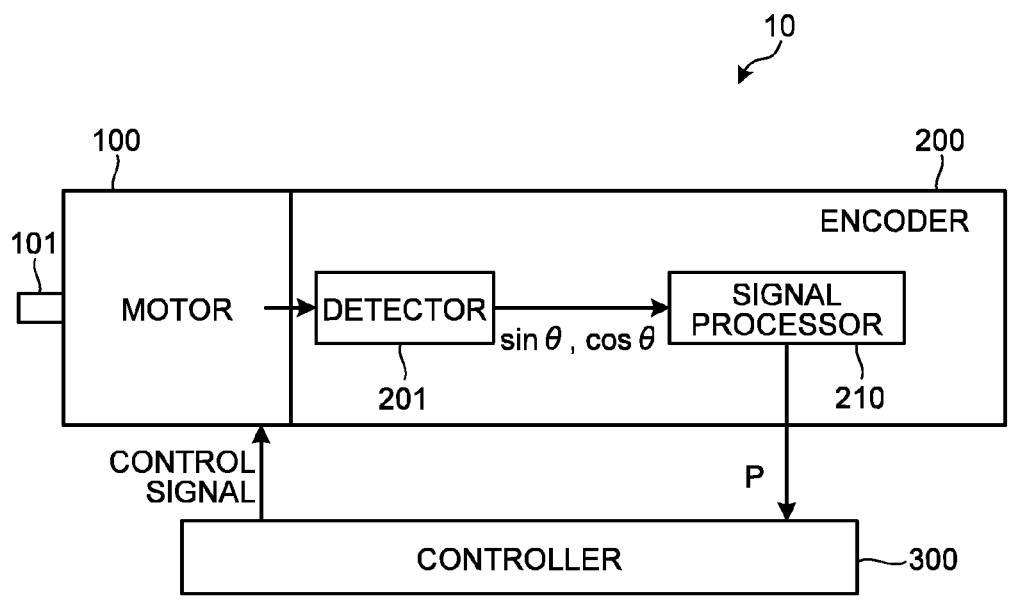
FIG. 1 is a schematic diagram to explain a motor system according to an embodiment of the present invention.

First, with reference to FIG. 1, a structure of a motor system according to an embodiment of the present invention is described. FIG. 1 is a schematic diagram to explain the motor system according to the embodiment of the present invention.

As illustrated in FIG. 1, a motor system 10 according to the embodiment includes a motor 100, an encoder 200, and a controller 300.

The motor 100 is an example of a power generation source that does not include the encoder 200. The motor 100 includes a rotational shaft 101 on at least one side thereof and outputs rotational power by rotating the rotational shaft 101 around a rotational axis. The motor 100 may be a linear motor.

The motor 100 is not limited to a specific motor and any motors can be applicable that are controlled by the controller 300 on the basis of a detection position P output from the encoder 200. In addition, the motor 100 is not limited to an electrical motor unit that uses electricity as a power source. For example, the motor 100 may be a motor unit that uses another power source, such as a hydraulic motor unit, an air motor unit, or a steam motor unit. A case where the motor 100 is the electrical motor unit is described below for expository convenience.

The encoder 200 is disposed on a side opposite the rotational shaft 101 of the motor 100 and connected to another rotational shaft (not illustrated) that rotates in conjunction with the rotational shaft 101. The encoder 200 detects the detection position P (also referred to as a rotational angle, a position of the motor 100, or the like) of the rotational shaft 101 outputting rotational power by detecting a position of the rotational shaft 101, and outputs the detection position P to the controller 300.

The encoder 200 may detect at least one of a velocity (also referred to as a rotational velocity, an angular velocity, a velocity of the motor 100, or the like) and an acceleration (also referred to as a rotational acceleration, an angular acceleration, an acceleration of the motor 100, or the like) of the rotational shaft 101 in addition to the detection position P of the motor 100. In this case, the velocity and the acceleration of the motor 100 can be detected by processing such as differentiation of the detection position P with respect to time once or twice. The following description is made assuming that physical quantity detected by the encoder 200 is the detection position P for expository convenience.

The disposition of the encoder 200 is not limited to a specific position. For example, the encoder 200 may be disposed so as to be directly connected to the rotational shaft 101 outputting power, or may be connected to a rotating body such as the rotational shaft 101 through another mechanism such as a speed reducer or a rotational direction converter.

The controller 300 acquires the detection position P output from the encoder 200. The controller 300 controls rotation of the motor 100 on the basis of the detection position P. Accordingly, in the embodiment using the electrical motor unit as the motor 100, the controller 300 controls the rotation of the motor 100 by controlling a current or a voltage applied to the motor 100 on the basis of the detection position P. Furthermore, the controller 300 can control the motor 100 by acquiring an upper control signal from an upper controller (not illustrated) such that a position indicated by the upper control signal and the like are output from the rotational axis of the motor 100. When the motor 100 uses other power sources such as hydraulic, air, and steam, the controller 300 can control the rotation of the motor 100 by controlling a supply of the power sources.

(2. Structure of Encoder)

Figure 2:
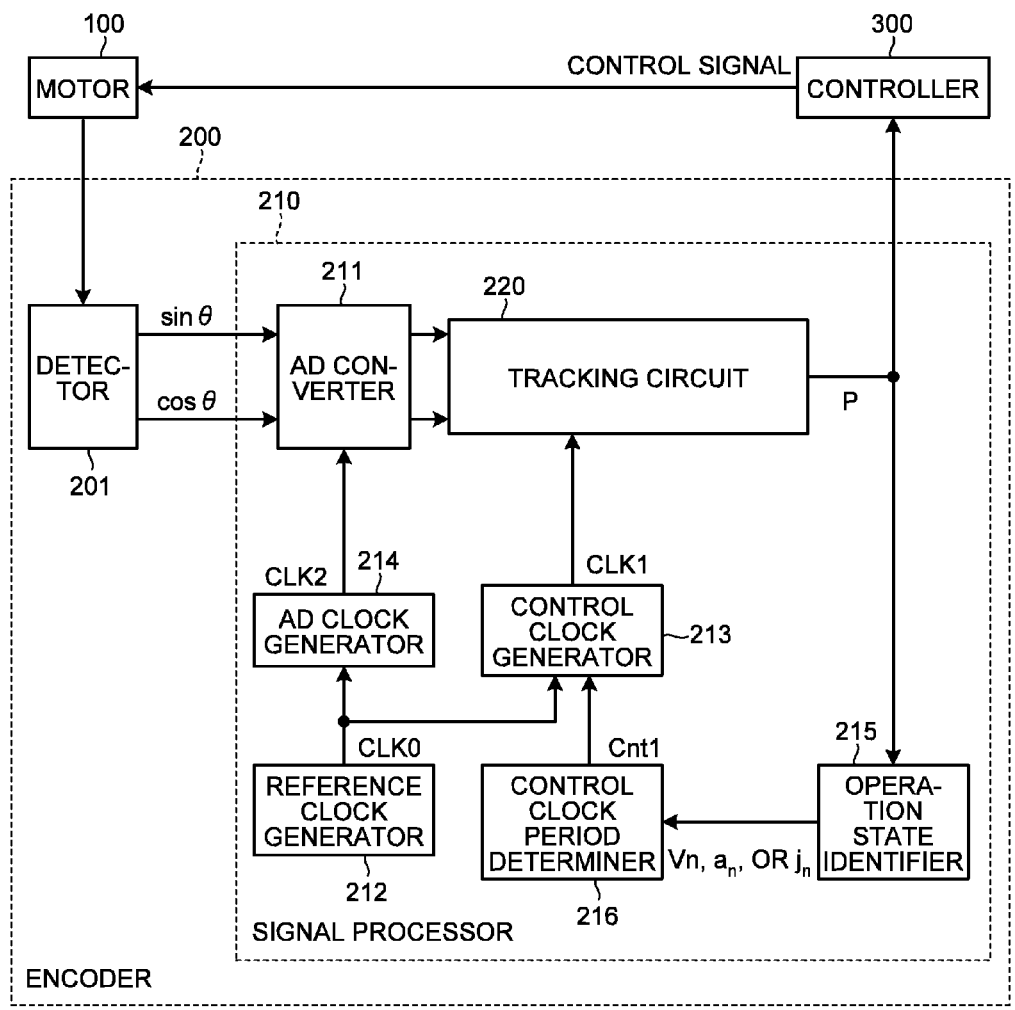
FIG. 2 is a schematic diagram to explain an encoder according to the embodiment.

Next, with reference to FIG. 2, a structure of the encoder 200 according to the embodiment of the present invention is described. FIG. 2 is a schematic diagram to explain the encoder 200 according to the embodiment.

As illustrated in FIG. 2, the encoder 200 according to the embodiment includes mainly a detector 201 and a signal processor 210.

The detector 201 outputs an analog sine wave signal and an analog cosine wave signal (examples of a periodic analog signal) in accordance with the position of the motor 100. Detectors that employ various detection principles such as optical, magnetic, mechanical, resolver, and hybrid detectors and that are capable of outputting the analog sine wave signal and the analog cosine wave signal in accordance with the position of the motor 100 can be used as the detector 201.

The signal processor 210 converts the analog sine wave signal and the analog cosine wave signal detected by the detector 201 into the detection position P of the motor 100 at an arithmetic period Tc (also referred to as a detection period) of the detection position P of the motor 100.

As illustrated in FIG. 2 in further detail, the signal processor 210 includes an AD converter 211, a reference clock generator 212, a control clock generator 213, an AD clock generator 214, an operation state identifier 215, a control clock period determiner 216, and a tracking circuit 220. The control clock generator 213 and the control clock period determiner 216 are examples of an arithmetic period determiner. The AD converter 211 is an example of a means for converting. The control clock generator 213 and the control clock period determiner 216 are examples of a means for changing. The operation state identifier 215 is an example of a means for identifying. The tracking circuit 220 is an example of a means for calculating. Their structures are sequentially described below.

The reference clock generator 212 generates a reference clock signal CLK0 used as a reference for a control clock signal CLK1 and an AD clock signal CLK2. The reference clock generator 212 outputs the reference clock signal CLK0 at a reference period T0. The reference period T0 is set shorter than other periods because the reference period T0 is used as a reference for the other periods (the arithmetic period Tc and a conversion period Tad).

The control clock generator 213 counts the reference clock signal CLK0, generates the control clock signal CLK1 when the count value reaches a predetermined count threshold Cnt1, and resets the count value to zero (0). The period at which the control clock signal CLK1 is generated is also referred to as the arithmetic period Tc herein.

The AD clock generator 214 counts the reference clock signal CLK0, generates the AD clock signal CLK2 when the count value reaches a predetermined count threshold Cnt2, and resets the count value to zero (0). The period at which the AD clock signal CLK2 is generated is also referred to as the conversion period Tad herein.

The AD converter 211 converts the analog sine wave signal and the analog cosine wave signal output from the detector 201 into digital signals at a timing when receiving the AD clock signal CLK2, i.e., for each conversion period Tad. The conversion timing, for example, whether a case where the reference clock is changed from a Lo level to a Hi level or a case where the reference clock is changed from the Hi level to the Lo level is used, is determined by an AD converter used in the AD converter 211.

The tracking circuit 220 performs closed loop PI control with a proportional gain Kp and an integral gain Ki on input from the AD converter 211, and outputs the detection position P. The tracking circuit 220 performs the arithmetic processing of the detection position P by the PI control at the timing when the control clock signal CLK1 generated from the control clock generator 213 is changed.

Figure 3:
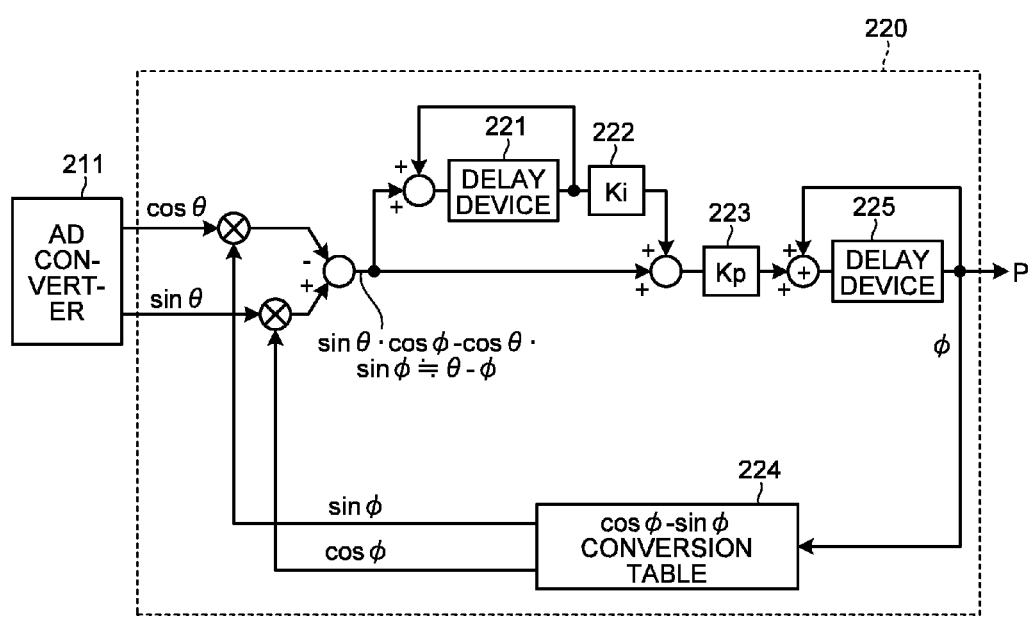
FIG. 3 is a schematic diagram to explain position arithmetic processing by a tracking technique of the embodiment.

Operation of the tracking circuit 220 is described with reference to FIG. 3. FIG. 3 is a schematic diagram to explain position arithmetic processing by the tracking technique of the embodiment.

As illustrated in FIG. 3, the tracking circuit 220 includes delay devices 221 and 225, an integral gain multiplier 222, a proportional gain multiplier 223, and a cos φ-sin φ conversion table 224.

The tracking circuit 220, which has the structure illustrated in FIG. 3, calculates the detection position P and the like in the following manner. That is, the tracking circuit 220 multiplies cos θ and sin θ from the AD converter 211 by cos φ and sin φ, which are converted by the cos φ-sin φ conversion table 224 using φ at the last arithmetic period Tc, as indicated in FIG. 3, and calculates sin θ·cos φ−cos θ·sin φ=sin(θ−φ)≅θ−φ. Then, the tracking circuit 220 performs arithmetic operation by the PI control such that a value of θ−φ approximates zero. Specifically, the delay device 221 and the integral gain multiplier 222 perform integral arithmetic operation on the value of θ−φ and the proportional gain multiplier 223 multiplies the value of θ−φ by the proportional gain. In this way, the tracking circuit 220 performs the PI control by adding the value of integral and the proportional gain multiplication value. In addition, the tracking circuit 220 calculates φ by adding an output value by the PI control to φ at the last arithmetic period Tc by the delay device 225 and outputs the value of calculated φ to the operation state identifier 215 and the controller 300 as the detection position P.

Although the tracking processing by the PI control is described herein, the control method may be P control, I control, or PID control.

The operation state identifier 215 calculates a velocity V of the motor 100 on the basis of a difference value of time-series data of the detection position P. The operation state identifier 215 calculates an acceleration a of the motor 100 on the basis of a difference value of the velocity V in time series. In addition, the operation state identifier 215 calculates a jerk j of the motor 100 on the basis of a difference value of the acceleration a in time series.

The velocity V, the acceleration a, and the jerk j of the motor 100 represent an operation state of the motor 100 at the time when the detection is performed by the detector 201. The operation state identifier 215 identifies the operation state of the motor 100 by calculating the acceleration a and the jerk j in this way. Herein, it is described that the operation state is identified by the acceleration a and the jerk j. The operation state, however, may not include the jerk j or may include the velocity V if at least the operation state includes the acceleration a. The acceleration a may vary due to detection errors and the like. Thus, the inclusion of the jerk j in the operation state enables a more accurate operation state to be identified.

The control clock period determiner 216 determines the timing when the control clock generator 213 generates the control clock signal CLK1 in accordance with the operation state identified by the operation state identifier 215, i.e., the count threshold Cnt1 of the reference clock signal CLK0, which serves to represent the arithmetic period Tc. As a result, the control clock generator 213 outputs the control clock signal CLK1 to cause the tracking circuit 220 to calculate the detection position P each time the count value of the reference clock signal CLK0 reaches the count threshold Cnt1 determined by the control clock period determiner 216. That is, the arithmetic period Tc at which the tracking circuit 220 calculates the detection position P by the tracking technique, is determined by the control clock period determiner 216 and the control clock generator 213 (examples of the arithmetic period determiner).

The control clock period determiner 216 determines the periods of the control clock signal CLK1 and the AD clock signal CLK2 in accordance with the operation state. Specifically, in static operation and constant velocity operation, the control clock period determiner 216 sets the control clock signal CLK1 and the AD clock signal CLK2 to have the same period by setting the counter threshold Cnt1 and the counter threshold Cnt2 to the same value. In acceleration operation, the control clock period determiner 216 sets the control clock signal CLK1 to have a shorter period than that of the AD clock signal CLK2 by setting the counter threshold Cnt1 to a smaller value than the counter threshold Cnt2.

(3. An Example of Operation of the Embodiment)

The structures of the motor system 10 according to the embodiment and the like are described as above.

Next, an example of the operation of the motor system 10 and the like is described by exemplifying processing examples in each structure in greater detail.

Figure 4:
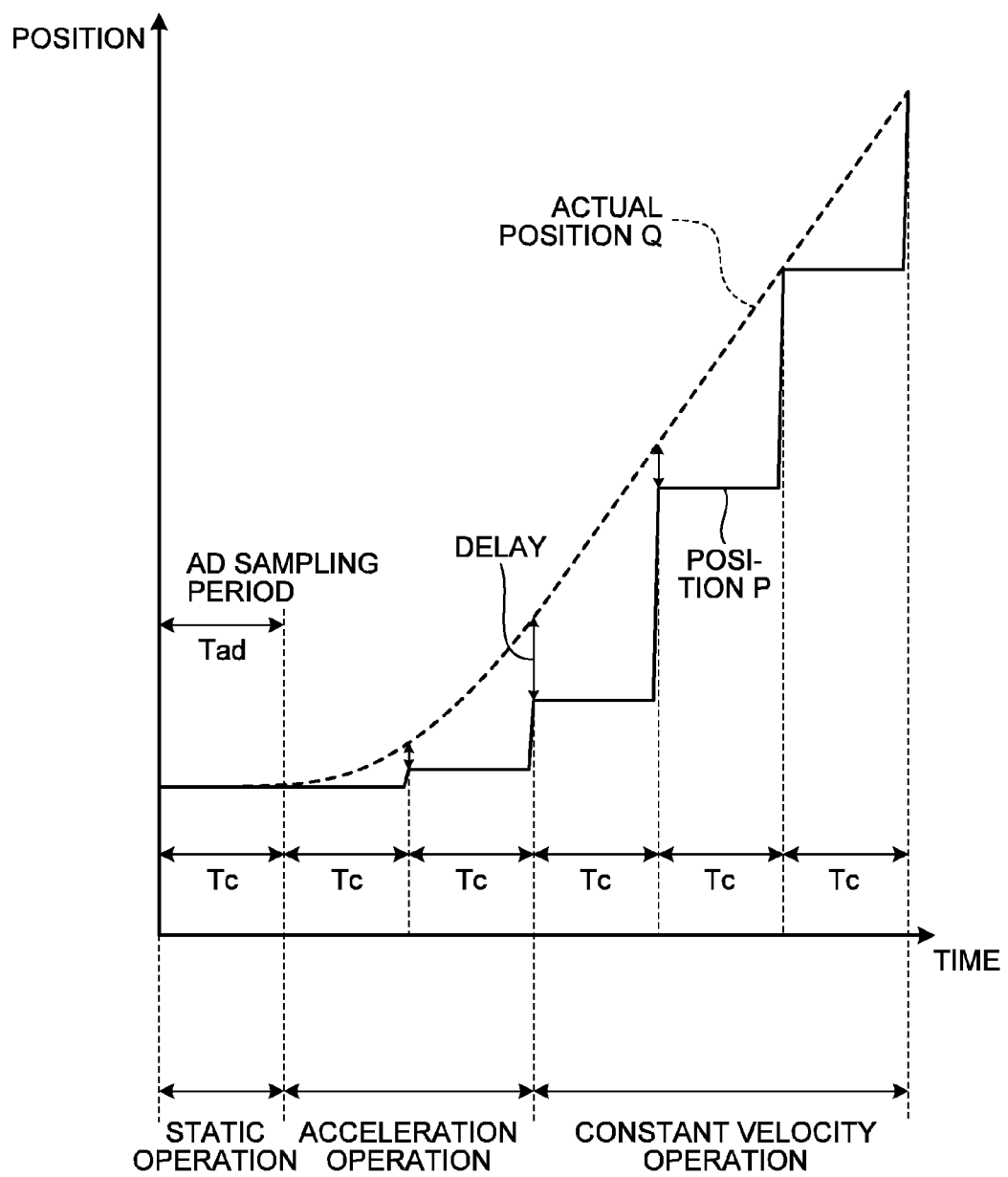
FIG. 4 is a graph illustrating a relationship between a detection position P detected by the encoder and an actual position Q when the position arithmetic processing by the tracking technique is performed once at a period of performing AD conversion.
Figure 5:
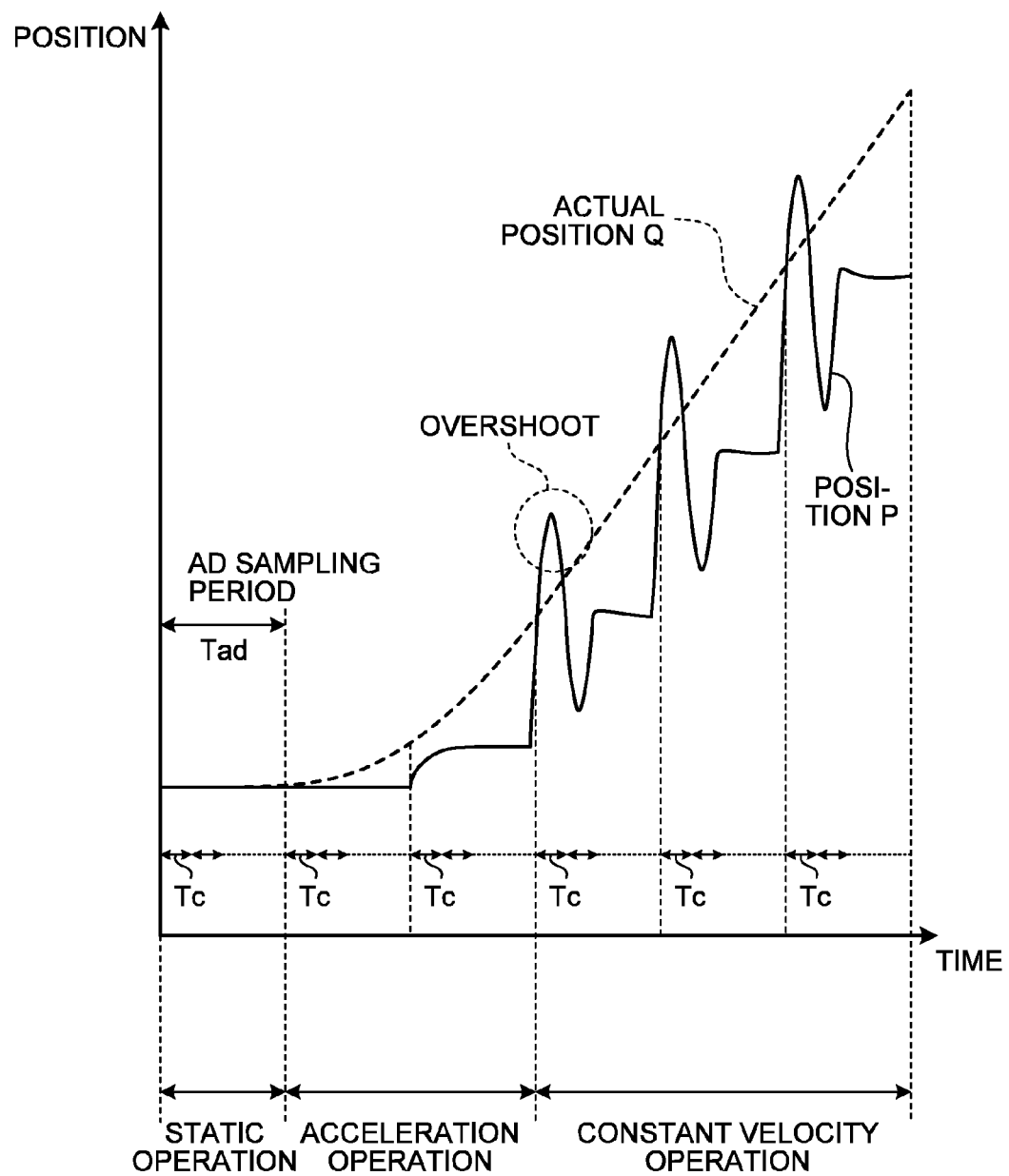
FIG. 5 is a graph illustrating a relationship between the detection position P detected by the encoder and the actual position Q when the position arithmetic processing by the tracking technique is performed a plurality of times at the period of performing the AD conversion.

With reference to FIGS. 4 to 6, an example of, particularly, output operation of the detection position P performed by the encoder 200 in the motor system 10 according to the embodiment and the like is described.

FIG. 4 is a graph illustrating a relationship between the detection position P detected by the encoder 200 and an actual position Q when the position arithmetic processing by the tracking technique is performed once at a period of performing the AD conversion. FIG. 5 is a graph illustrating a relationship between the detection position P detected by the encoder 200 and the actual position Q when the position arithmetic processing by the tracking technique is performed a plurality of times at the period of performing the AD conversion. FIG. 6 is a graph illustrating a relationship between the detection position P detected by the encoder 200 and the actual position Q in the embodiment.

FIG. 4 illustrates a position detection result when the motor 100 proceeds from the static operation to the constant velocity operation through the acceleration operation. As illustrated in FIG. 4, in the position detection method in which the processing by the tracking technique is performed once at the timing of the AD conversion, i.e., the position detection method in which the conversion period Tad and the arithmetic period Tc are equal to each other, the detection position P can be detected without the difference from the actual position Q in the constant velocity operation including the static operation, but in the acceleration operation, the detection position P delayed from the actual position Q is output due to characteristics of the processing by the tracking technique.

To reduce the delay, the tracking circuit 220 performs the arithmetic operation faster than the period of the AD conversion such that the detection position P converges to the actual position Q of the motor 100 (conversion period Tad>>arithmetic period Tc). Meanwhile, the arithmetic period Tc at which the control clock signal CLK1 is output is set shorter than the conversion period Tad at which the AD clock signal CLK2 is output. In the embodiment, this adjustment is achieved by the control clock period determiner 216 setting the count threshold Cnt1 of the reference clock signal CLK0 in the control clock generator 213 to be a smaller value than the count threshold Cnt2 of the reference clock signal CLK0 in the AD clock generator 214. FIG. 5 illustrates the position detection in this state. As illustrated in FIG. 5, in the position detection from the static operation to the acceleration operation, the value converges well and the delay is reduced by the arithmetic operation repeated within the conversion period Tad.

However, in the constant velocity operation, the detected detection position P overshoots the actual position Q, and in some cases, a positional error is further increased than a case where the arithmetic period Tc of the tracking circuit 220 and the conversion period Tad of the AD converter 211 are equal to each other. Because the tracking circuit 220 performs the arithmetic operation faster than the AD conversion, a value of integral input to the integral gain Ki approximates a value of the static operation. This causes the tracking circuit 220 to show a phenomenon like a step response when the next AD conversion value is input to the tracking circuit 220, thereby resulting in the overshoot of the detection position P.

To avoid the phenomenon, the encoder 200 according to the embodiment causes the tracking circuit 220 to temporarily stop performing the arithmetic operation faster than the period of the AD conversion by causing the control clock period determiner 216 to adjust the count threshold Cnt1 in accordance with the absolute value of the acceleration a representing the operation state of the motor 100 identified by the operation state identifier 215.

For example, when the absolute value of the acceleration a is close to zero, the control clock period determiner 216 deems that the motor 100 is in the constant velocity operation and sets the control clock signal CLK1 and the AD clock signal CLK2 to have the same period. That is, the control clock period determiner 216 causes the tracking circuit 220 to stop performing the arithmetic operation faster than the AD conversion by setting the count threshold Cnt1 of the reference clock signal CLK0 in the control clock generator 213 and the count threshold Cnt2 of the reference clock signal CLK0 in the AD clock generator 214 to the same value.

On the other hand, for example, when the absolute value of the acceleration a is somewhat larger than zero, the control clock period determiner 216 deems that the motor 100 is in the acceleration operation and sets the control clock signal CLK1 to a smaller value than the AD clock signal CLK2. That is, the control clock period determiner 216 causes the tracking circuit 220 to perform the arithmetic operation faster than the AD conversion by setting the count threshold Cnt1 of the reference clock signal CLK0 in the control clock generator 213 to a smaller value than the count threshold Cnt2 of the reference clock signal CLK0 in the AD clock generator 214.

The change of the count threshold Cnt1 in the control clock generator 213 in accordance with the absolute value of the acceleration a is performed on the basis of a threshold TH as a reference of determination. The threshold TH can be arbitrarily set by the control clock period determiner 216. A change value of the count threshold Cnt1 in the control clock generator 213 can also be arbitrarily set by the control clock period determiner 216.

FIG. 6 illustrates a position detection result in this state. As illustrated in FIG. 6, while an overshoot remains in the switching from the acceleration operation to the constant velocity operation, in the succeeding constant velocity operation, the detection position P follows the actual position Q well. Although the change of the count threshold Cnt1 in the control clock generator 213 based on the acceleration a is described herein, the count threshold Cnt1 can also be changed in accordance with the velocity V or the jerk j.

(4. Examples of Effects of the Embodiment)

The motor system 10, the encoder 200 included in the motor system 10, and the signal processor 210 (the motor system 10 and the like) included in the encoder 200 have been described as above.

The encoder 200 according to the embodiment can reduce a position difference from the actual position Q of the motor 100 due to the delay or the error by causing the tracking circuit 220 to perform the arithmetic operation faster than the period of the AD conversion in the acceleration operation such that the detection position P converges to the actual position Q of the motor 100. At this time, the arithmetic period of the tracking circuit 220 can be arbitrarily set to the count threshold Cnt1. As a result, the degree of freedom in arithmetic operation is not limited.

In the constant velocity operation, the tracking circuit 220 is caused to stop performing the arithmetic operation faster than the period of the AD conversion in accordance with the acceleration a or the jerk j representing the operation state of the motor 100 identified by the operation state identifier 215, thereby reducing the overshoot of the detection position P and the positional error. The change of the arithmetic period of the tracking circuit 220 according to the value of the acceleration a or the jerk j is performed on the basis of the threshold TH capable of being arbitrarily set. As a result, the degree of freedom in arithmetic operation is not limited.

In addition, the change of the arithmetic period of the tracking circuit 220 can be performed by the signal processor 210 alone, thereby requiring no additional parts, enabling production cost to be reduced, and without limiting the degree of freedom in arithmetic operation of the controller 300.

The embodiment of the present invention has been described in detail with reference to the accompanying drawings as above. However, it is needless to say that the present invention is not limited to the examples of the embodiment. It is apparent that those who have normal knowledge in the technical field to which the present invention belongs can make various changes and modifications within the scope of technical idea described in the claims. Therefore, the techniques after the changes and modifications deservingly belong to the technical scope of the present invention.

For example, in the embodiment, the signal processor 210 is disposed in the encoder 200, but the signal processor 210 may be individually formed outside the encoder 200 or may be disposed in the controller 300.

Although the control clock signal CLK1 in the control clock generator 213 serving as a clock input to the tracking circuit 220 is changed in accordance with the operation state in the embodiment, the control clock signal CLK1 and the AD clock signal CLK2 may be switched in accordance with the operation state as the clock input to the tracking circuit 220.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal processor comprising:
an AD converter configured to convert a periodic analog signal based on a position of a motor into a digital signal at a predetermined conversion period;
a tracking circuit configured to calculate the position of the motor at an arithmetic period on the basis of the digital signal that is converted and output at the conversion period by the AD converter;
an operation state identifier configured to identify an operation state of the motor on the basis of the position of the motor calculated by the tracking circuit; and
an arithmetic period determiner configured to change the arithmetic period of the tracking circuit in accordance with the operation state of the motor identified by the operation state identifier such that the position of the motor calculated by the tracking circuit follows an actual position of the motor,
wherein the arithmetic period determiner determines the arithmetic period to be a period equal to or less than the conversion period at which the AD converter outputs the digital signal.

2. The signal processor according to claim 1, wherein the arithmetic period determiner determines the arithmetic period to be a shorter period than the conversion period when the operation state of the motor identified by the operation state identifier represents an acceleration or a deceleration equal to or more than a predetermined degree, and determines the arithmetic period to be a period equal to the conversion period when the operation state of the motor identified by the operation state identifier represents constant velocity operation.

3. A motor system, comprising:
a motor;
an encoder configured to detect a position of the motor, the encoder comprising a signal processor and a detector configured to detect an analog signal periodically changing in accordance with the position of the motor; and
a controller configured to control the motor on the basis of the position of the motor detected by the encoder, wherein
the signal processor includes:
an AD converter configured to convert the periodic analog signal output from the detector in accordance with a position of the motor into a digital signal at a predetermined conversion period;

a tracking circuit configured to calculate the position of the motor at an arithmetic period on the basis of the digital signal that is converted and output at the conversion period by the AD converter;

an operation state identifier configured to identify an operation state of the motor on the basis of the position of the motor calculated by the tracking circuit; and an arithmetic period determiner configured to change the arithmetic period of the tracking circuit in accordance with the operation state of the motor identified by the operation state identifier such that the position of the motor calculated by the tracking circuit follows an actual position of the motor, wherein the arithmetic period determiner determines the arithmetic period to be a period equal to or less than the conversion period at which the AD converter outputs the digital signal.

4. The motor system according to claim 3, wherein the arithmetic period determiner determines the arithmetic period to be a shorter period than the conversion period when the operation state of the motor identified by the operation state identifier represents an acceleration or a deceleration equal to or more than a predetermined degree, and determines the arithmetic period to be a period equal to the conversion period when the operation state of the motor identified by the operation state identifier represents constant velocity operation.

5. A signal processor, comprising:

a means for converting a periodic analog signal based on a position of a motor into a digital signal at a predetermined conversion period;

a means for calculating the position of the motor at an arithmetic period on the basis of the digital signal that is converted and outputted at the conversion period by the means for converting;

a means for identifying an operation state of the motor on the basis of the position of the motor calculated by the means for calculating; and a means for changing the arithmetic period of the means for calculating in accordance with the operation state of the motor identified by the means for identifying such that the position of the motor calculated by the means for calculating follows an actual position of the motor, wherein the means for changing determines the arithmetic period to be a period equal to or less than the conversion period at which the means for converting outputs the digital signal.

6. The signal processor according to claim 5, wherein the means for changing determines the arithmetic period to be a shorter period than the conversion period when the operation state of the motor identified by the means for identifying represents an acceleration or a deceleration equal to or more than a predetermined degree, and determines the arithmetic period to be a period equal to the conversion period when the operation state of the motor identified by the means for identifying represents constant velocity operation.

* * * * *